H. D. Snow,
Governor,
No. 69,499. Patented Oct. 1, 1867.
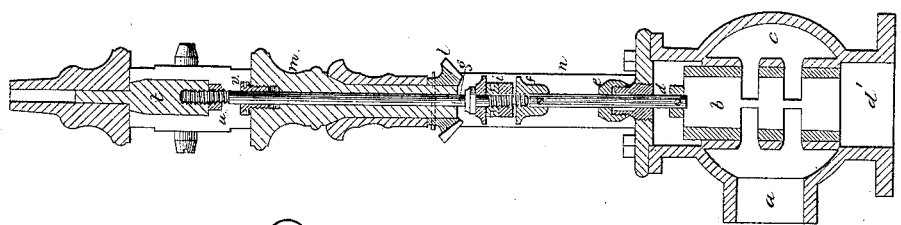
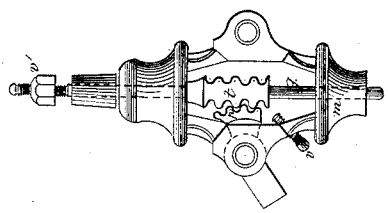
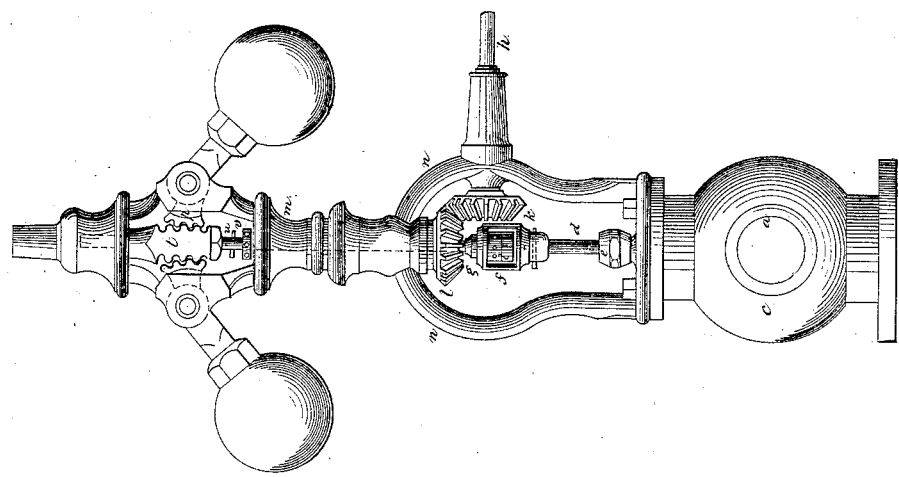
Witnesses.
L. Walker
Geo. D. Walker
Inventor
H. D. Snow
per L. W. Serrell
Atty

United States Patent Office.

HERVEY D. SNOW, OF BENNINGTON, VERMONT.

Letters Patent No. 69,499, dated October 1, 1867.

---

IMPROVEMENT IN STEAM-GOVERNORS.

---

The Schedule referred to in these Letters Patent and making part of the same.

---

TO ALL WHOM IT MAY CONCERN:

Be it known that I, HERVEY D. SNOW, of Bennington, in the State of Vermont, have invented, made, and applied to use a certain new and useful Improvement in Governors; and I do hereby declare the following to be a full, clear, and exact description of the said invention, reference being had to the annexed drawing, making part of this specification, wherein—

Figure 1 is an elevation of the said governor.
Figure 2 is a vertical section of the same at right angles to fig. 1, and
Figure 3 shows a variation in the stop applied to the movements of the governor-balls.
Similar marks of reference denote the same parts.

The object of my said invention is to adjust the governor so as to prevent the valve closing entirely or too much when the work is thrown off the engine, so that only the amount of steam shall be admitted to the engine to run the same at the regular speed, the adjustment allowing the governor to be set correctly according to the pressure of steam in proportion to the friction to be overcome in the engine and shafting. I also construct my governor with an adjustment between the governor-spindle and the valve-spindle, so that the speed of the governor may be greater or less, as required, before the valve is moved by the governor sufficiently for the regulation of the supply of steam.

In the drawing, $a$ represents the steam pipe, $b$ the valve, formed as a cylinder of rings sliding in a cylinder, $c$, having openings corresponding to the openings between the rings of the valve $b$, so as to furnish any desired length of valve-opening, the movements required to be given to said valve being but little. $d'$ is the steam pipe or passage to the valve-chest of the engine. The rod $d$ of the valve $b$ passes through a stuffing-box, $e$, and is provided with a bridle, $f$, within which are the set-nuts $i$, upon the screwed end of the governor-spindle $g$, so that the spindle $g$ may revolve and move the valve-rod $d$ endwise as the governor-balls rise or fall, but the valve-rod $d$ does not revolve. $h$ is the shaft, receiving rotation from the engine, and acting through the gears $k\ l$ to revolve the frame or head $m$ of the governor, which is sustained by and revolves in a socket upon the standard $n$. The spindle $g$ extends up through this head $m$, and screws into the rack $t$, having teeth on its sides taking the segments on the inner ends of the arms $p$ of the governors, so that an end motion is given to the spindle $g$ by the rise and fall of the governor-balls, and from said spindle to the valve $b$. The spindle $g$ screwing into the rack $t$, allows the length between said rack and the valve $b$ to be increased or lessened. If it is lessened the balls will have to rise to a higher plane before the supply of steam is checked, hence the speed will be augmented, and *vice versa*. In order to prevent the valve $b$ closing entirely as the balls rise when the work is thrown off the engine, I apply an adjustable stop, $v$, that prevents the further rise of said balls, and keeps the valve open, and by adjusting this stop $v$ in proportion to pressure of steam and friction to be overcome, the engine can be maintained at the usual speed without the variations incident to the rise of the balls and the shutting off of the steam, usual when the work is thrown off the engine. This stop $v$ may be in the form of a nut, seen in figs. 1 and 2, to take the lever or pin $u$ through the stem $g$, or it may be an adjusting-screw applied to stop the movement of the sector or arm of the governor, seen in fig. 3, or the nut $v'$, fig. 3, may be employed for the same purpose. It is to be understood that the stop for preventing the valve closing entirely is to be adjusted for determining the speed of the engine when the work is thrown off, and that the adjustment for varying the speed of the engine is an independent operation that regulates the position of the valve to the governor.

What I claim, and desire to secure by Letters Patent, is—

The arrangement of the revolving head $m$, segment-arms $p$, and governor-balls, in combination with the valve-rod and adjustments $u\ v$, as and for the purposes set forth.

In witness whereof I have hereunto set my signature this twelfth day of April, 1867.

H. D. SNOW.

Witnesses:
    D. WEBSTER DIXON,
    ORIN D. ADAMS.